US012613460B2

(12) United States Patent
Chen

(10) Patent No.: US 12,613,460 B2
(45) Date of Patent: Apr. 28, 2026

(54) LIGHT SOURCE DRIVING CIRCUIT AND PROJECTION DEVICE USING THE SAME

(71) Applicant: Qisda Corporation, Taoyuan City (TW)

(72) Inventor: Chuan-Chu Chen, Taoyuan City (TW)

(73) Assignee: QISDA CORPORATION, Taoyuan City (TW)

( * ) Notice: Subject to any disclaimer, the term of this patent is extended or adjusted under 35 U.S.C. 154(b) by 421 days.

(21) Appl. No.: 18/379,232

(22) Filed: Oct. 12, 2023

(65) Prior Publication Data
US 2024/0152042 A1 May 9, 2024

(30) Foreign Application Priority Data
Nov. 7, 2022 (CN) .......................... 202211382582.5

(51) Int. Cl.
G03B 21/20 (2006.01)
H01S 5/068 (2006.01)
(52) U.S. Cl.
CPC ..... G03B 21/2053 (2013.01); G03B 21/2033 (2013.01)
(58) Field of Classification Search
CPC ............. H01S 5/06223; H01S 5/06253; H01S 5/0427; H01S 5/0428; H01S 5/06216; H01S 5/06817; G03B 21/2053; G03B 21/2033; H05B 45/325; H05B 45/345
See application file for complete search history.

(56) References Cited

U.S. PATENT DOCUMENTS

2020/0245432 A1* 7/2020 Lee ......................... H05B 45/10
2022/0021181 A1* 1/2022 Wu ........................ H01S 5/4093

* cited by examiner

*Primary Examiner* — Ryan D Howard

(57) ABSTRACT

The application discloses a projection device comprising: a plurality of optical source modules; and a plurality of optical source driving circuits. Each of the optical source driving circuits includes: an optical source driving unit, for receiving and being controlled by a selection signal and a pulse width modulation signal, the pulse width modulation signal controlling a current amplitude of the drive current from the optical source driving unit to the optical source module; and a delay circuit for controlling the selection signal based on the adjusted threshold voltage to determine when to release the selection signal, the plurality of delay circuits in the plurality of optical source driving circuits release the selection signals synchronously, enabling the plurality of optical source driving circuits to synchronously output the plurality of drive currents to the plurality of optical source modules.

20 Claims, 3 Drawing Sheets

LIGHT SOURCE DRIVING CIRCUIT AND PROJECTION DEVICE USING THE SAME

This application claims the benefit of People's Republic of China application Serial No. 202211382582.5, filed Nov. 7, 2022, the subject matter of which is incorporated herein by reference.

TECHNICAL FIELD

The present invention relates to a projection device and, more specifically, to a laser diode light source driving circuit and a projection device using the same.

BACKGROUND

Projection devices, such as projectors or projection televisions, are increasingly being used by people in their daily lives to achieve high-quality audiovisual experiences.

Advanced projection devices, such as projection televisions, often utilize R (red)/G (green)/B (blue) laser diodes (LDs) as light sources. These advanced projection devices require a plurality of sets of laser diode light source modules, which can be connected in parallel or in series. Due to the use of a plurality of sets of laser diode light source modules in the advanced projection devices, a plurality of sets of laser diode light source driving circuits are also required, with each laser diode light source driving circuit driving each laser diode light source module.

However, due to the significant differences in characteristics among R, G, and B laser diode light source modules, the compensation adjustments for the laser diode light source driving circuits vary greatly. Different compensation capacitors are required for the R, G, and B laser diode light source driving circuits. However, the use of different compensation capacitors results in asynchronous startup sequences for the R, G, and B laser diode light source driving circuits. As a result, when the projection device starts projecting images, especially during startup, viewers may see a poor-quality startup image with color mixing issues. For example, the image may first display the red component, then the cyan component (a mixture of green and blue), and finally the white color (a mixture of R, G, and B), which affects the viewers' entertainment experience.

SUMMARY

The purpose of the present invention is to disclose a light source driving circuit and a projection device using the same, which can synchronize the startup timing of all laser diode light source driving circuits even with different compensating capacitors. Therefore, when the projection device is powered on, viewers will not see a poor color-mixing startup screen, improving the entertainment experience.

Based on the above objectives, the present invention discloses a projection device comprising: a plurality of optical source modules; and a plurality of optical source driving circuits, respectively coupled to and driving the plurality of optical source modules. Each of the optical source driving circuits includes: an optical source driving unit, coupled to and driving the optical source module, the optical source driving unit receiving an input voltage, the optical source driving unit receiving and controlled by an enable signal, the enable signal determining whether the optical source driving unit is activated, the optical source driving unit further receiving and controlled by a selection signal, the selection signal determining a timing at which the optical source driving unit outputs a drive current to the optical source module, the optical source driving unit receiving and controlled by a pulse width modulation signal, the pulse width modulation signal controlling a current amplitude of the drive current from the optical source driving unit to the optical source module; a voltage conversion circuit, coupled to the optical source driving unit and the optical source module, the voltage conversion circuit converting the input voltage and outputting to the optical source module, the voltage conversion circuit providing feedback of a drive voltage of the optical source module to the optical source driving unit, and the optical source driving unit performing constant current control on the drive current output of the optical source module; a hysteresis comparator circuit, coupled to the optical source driving unit, the hysteresis comparator circuit controlling the enable signal based on an adjusted threshold voltage to determine whether to release the enable signal; and a delay circuit, coupled to the optical source driving unit, the delay circuit controlling the selection signal based on the adjusted threshold voltage to determine when to release the selection signal. The plurality of delay circuits in the plurality of optical source driving circuits release the selection signals synchronously, enabling the plurality of optical source driving circuits to synchronously output the plurality of drive currents to the plurality of optical source modules.

Preferably, the plurality of delay circuits in the plurality of optical source driving circuits determine when to synchronously release the selection signals based on a maximum compensating capacitance of the plurality of optical source driving circuits.

Preferably, each of the optical source modules comprises a plurality of laser diodes.

Preferably, the hysteresis comparator circuit comprises a first hysteresis comparator unit, a second hysteresis comparator unit, a first switching transistor, and a diode; the first hysteresis comparator unit receives the adjustment node voltage and a first reference voltage, and inputs an output signal of the first hysteresis comparator unit to the second hysteresis comparator unit; the second hysteresis comparator unit receives the output signal from the first hysteresis comparator unit and a second reference voltage, and inputs an output signal of the second hysteresis comparator unit to the first switching transistor to control turning on or turning off of the first switching transistor; the first switching transistor has a first terminal connected to ground, a second terminal coupled to the diode, and a control terminal receiving the output signal from the second hysteresis comparator unit; and the diode is coupled between the enable signal and the second terminal of the first switching transistor.

Preferably, when the adjustment node voltage is lower than the first reference voltage, the first hysteresis comparator unit outputs a high level signal to the second hysteresis comparator unit, the second hysteresis comparator unit outputs a high level signal to turn on the first switching transistor and the diode, and the enable signal is pulled down to de-activate the light source driving unit, the adjustment node voltage is gradually increased when the adjustment node voltage is charged by the pulse width modulation signal; when the adjustment node voltage reaches or exceeds the first reference voltage, the first hysteresis comparator unit outputs a low level signal to the second hysteresis comparator unit; the second hysteresis comparator unit to output a low level signal to the first switching transistor to turn off the first switching transistor; when the first switching transistor is off, the diode is turned off, and the hysteresis comparator circuit releases the enable signal; and in response to the released enable signal, the light source driving unit starts operating.

Preferably, the delay circuit comprises a second switching transistor, a third switching transistor, and a resistor-capacitor circuit; the second switching transistor is coupled to the adjustment node voltage through the resistor-capacitor circuit; the third switching transistor is coupled to the selection signal; and the resistor-capacitor circuit is coupled to the adjustment node voltage.

Preferably, when a capacitor cross voltage of the resistor-capacitor circuit is insufficient to turn on the second switch transistor, the adjustment node voltage turns on the third switch transistor to pull down the selection signal; and when the capacitor cross voltage of the resistor-capacitor circuit is sufficient to turn on the second switching transistor, the third switching transistor is turned off to release the selection signal. Wherein a time required for the second switching transistor to turn on is greater than a stabilization time of a voltage across a maximum compensation capacitor.

Based on the above objectives, the application further provides an optical source driving circuit coupled to and driving an optical source module, the optical source driving circuit including: an optical source driving unit, coupled to and driving the optical source module, the optical source driving unit receiving an input voltage, the optical source driving unit receiving and controlled by an enable signal, the enable signal determining whether the optical source driving unit is activated, the optical source driving unit further receiving and controlled by a selection signal, the selection signal determining a timing at which the optical source driving unit outputs a drive current to the optical source module, the optical source driving unit receiving and controlled by a pulse width modulation signal, the pulse width modulation signal controlling a current amplitude of the drive current from the optical source driving unit to the optical source module; a voltage conversion circuit, coupled to the optical source driving unit and the optical source module, the voltage conversion circuit converting the input voltage and outputting to the optical source module, the voltage conversion circuit providing feedback of a drive voltage of the optical source module to the optical source driving unit, and the optical source driving unit performing constant current control on the drive current output of the optical source module; a hysteresis comparator circuit, coupled to the optical source driving unit, the hysteresis comparator circuit controlling the enable signal based on an adjusted threshold voltage to determine whether to release the enable signal; and a delay circuit, coupled to the optical source driving unit, the delay circuit controlling the selection signal based on the adjusted threshold voltage to determine when to release the selection signal.

Preferably, the delay circuit determines when to release the selection signals based on a compensating capacitance of the optical source driving circuit.

Preferably, the optical source module comprises a plurality of laser diodes.

Preferably, the hysteresis comparator circuit comprises a first hysteresis comparator unit, a second hysteresis comparator unit, a first switching transistor, and a diode; the first hysteresis comparator unit receives the adjustment node voltage and a first reference voltage, and inputs an output signal of the first hysteresis comparator unit to the second hysteresis comparator unit; the second hysteresis comparator unit receives the output signal from the first hysteresis comparator unit and a second reference voltage, and inputs an output signal of the second hysteresis comparator unit to the first switching transistor to control turning on or turning off of the first switching transistor; the first switching transistor has a first terminal connected to ground, a second terminal coupled to the diode, and a control terminal receiving the output signal from the second hysteresis comparator unit; and the diode is coupled between the enable signal and the second terminal of the first switching transistor.

Preferably, when the adjustment node voltage is lower than the first reference voltage, the first hysteresis comparator unit outputs a high level signal to the second hysteresis comparator unit, the second hysteresis comparator unit outputs a high level signal to turn on the first switching transistor and the diode, and the enable signal is pulled down to de-activate the light source driving unit.

Preferably, the adjustment node voltage is gradually increased when the adjustment node voltage is charged by the pulse width modulation signal; when the adjustment node voltage reaches or exceeds the first reference voltage, the first hysteresis comparator unit outputs a low level signal to the second hysteresis comparator unit; the second hysteresis comparator unit to output a low level signal to the first switching transistor to turn off the first switching transistor; when the first switching transistor is off, the diode is turned off, and the hysteresis comparator circuit releases the enable signal; and in response to the released enable signal, the light source driving unit starts operating.

Preferably, the delay circuit comprises a second switching transistor, a third switching transistor, and a resistor-capacitor circuit; the second switching transistor is coupled to the adjustment node voltage through the resistor-capacitor circuit; the third switching transistor is coupled to the selection signal; and the resistor-capacitor circuit is coupled to the adjustment node voltage.

Preferably, when a capacitor cross voltage of the resistor-capacitor circuit is insufficient to turn on the second switch transistor, the adjustment node voltage turns on the third switch transistor to pull down the selection signal; when the capacitor cross voltage of the resistor-capacitor circuit is sufficient to turn on the second switching transistor, the third switching transistor is turned off to release the selection signal; and a time required for the second switching transistor to turn on is greater than a stabilization time of a voltage across a compensation capacitor.

Compared to existing technologies, the light source driving circuit proposed in this invention, along with its application in a projection device, introduces the use of delay circuits and hysteresis comparator circuits. These components allow for the pre-activation of each light source driving unit and ensure that the selection signals of the light source driving circuits are delayed and synchronized with the enable signals. As a result, synchronized drive currents are provided to each light source module, simultaneously illuminating them and eliminating the issue of poor color mixing that occurs when the projection device starts projecting an image.

Figure 1:
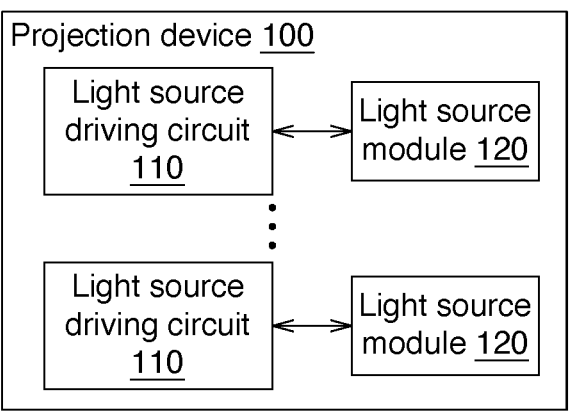
FIG. 1 illustrates a functional block diagram of a projection device according to one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

Please refer to FIG. 1, which illustrates a functional block diagram of a projection device according to an embodiment of the present invention. The projection device 100 includes a plurality of light source driving circuits 110 and a plurality of light source modules 120. The plurality of light source driving circuits 110 are respectively coupled to and drive the plurality of light source modules 120. For illustration purposes, the light source driving circuits 110 and light source modules 120 are exemplified as laser diode light source driving circuits and laser diode light source modules. However, it should be understood that the present invention is not limited to this example. A set of light source driving circuits 110 can drive a set of light source modules 120. For example, in one possible scenario, the projection device 100 includes 6 sets of light source driving circuits 110 and 6 sets of light source modules 120, wherein 2 sets of light source modules 120 are red (R) laser diode light source modules, 3 sets of light source modules 120 are green (G) laser diode light source modules, and 1 set of light source modules 120 is a blue (B) laser diode light source module.

Figure 2:
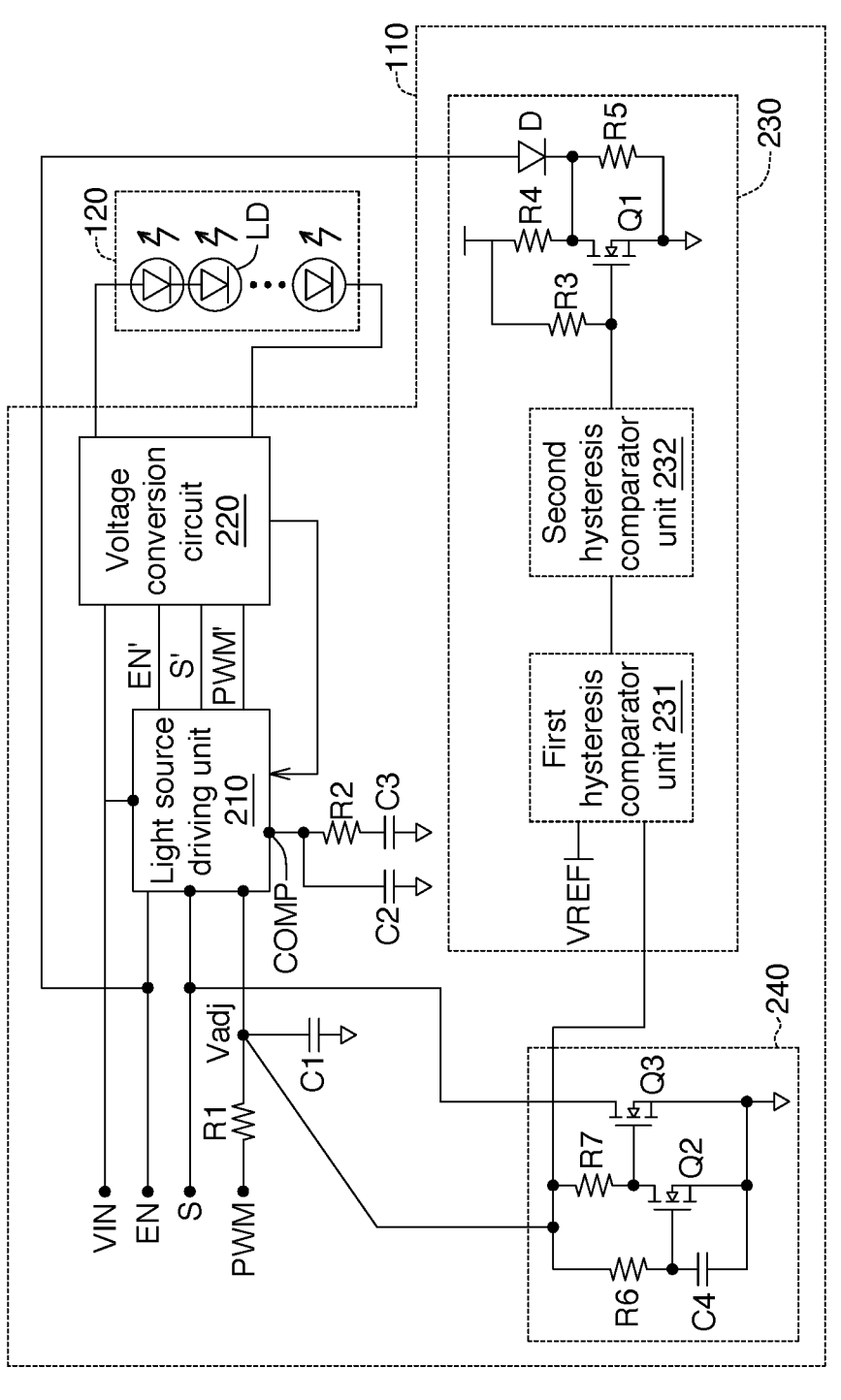
FIG. 2 displays a light source driving circuit and a light source module according to one embodiment of the present invention.

FIG. 2 shows the light source driving circuit 110 and the light source module 120 according to an embodiment of the present invention. As shown in FIG. 2, the light source driving circuit 110 includes a light source driving unit 210, a voltage conversion circuit 220, a hysteresis comparator circuit 230, and a delay circuit 240. The light source module 120 includes a plurality of laser diodes (LD) connected in series.

The light source driving unit 210, for example but not limited to, is a laser diode driver integrated circuit (IC). The specific architecture of the light source driving unit 210 is not particularly limited here. The light source driving unit 210 is coupled to the light source module 120 to drive the light source module 120. The light source driving unit 210 receives an input voltage VIN, which serves as an operating voltage source.

The light source driving unit 210 receives and is controlled by an enable signal EN, and the enable signal EN is controlled by the hysteresis comparison circuit 230. This means that even if the enable signal EN, supplied from an external source (not shown), is in an enabled state (e.g., but not limited to, logic high), the light source driving unit 210 remains inactive when the enable signal EN is controlled by the hysteresis comparison circuit 230 and is in a disabled state (e.g., but not limited to, logic low). The light source driving unit 210 responds to the enable signal EN in the enabled state and begins operation when the enable signal EN is released (not controlled, or not continuously pulled low by the hysteresis comparison circuit 230, thereby the enable signal received by the light source driving unit 210 is the externally supplied enable signal EN. In other words, the enable signal EN controls whether the light source driving unit 210 operates or not.

The light source driving unit 210 receives and is controlled by a selection signal S. The selection signal S controls the waveform timing of the drive current output by the light source driving unit 210 to the light source module 120. In other words, the selection signal S serves as a synchronous signal for the drive current. The selection signal S can also be controlled by the delay circuit 240. This means that even if the selection signal S, supplied from an external source (not shown), is in an enabled state, the light source driving unit 210 does not output the drive current when the selection signal S controlled by the delay circuit 240 is in a disabled state. The light source driving unit 210 responds to start outputting the drive current to the light source module 120 when the selection signal S is released by the delay circuit 240 (not controlled, or not continuously pulled low, thereby the selection signal received by the light source driving unit 210 is the same with the externally supplied selection signal S).

The light source driving unit 210 receives and is controlled by a pulse width modulation (PWM) signal PWM, where the PWM signal can control the magnitude of the driving current output from the light source driving unit 210 to the light source module 120.

As shown in FIG. 2, the light source driving circuit 110 further includes resistors R1, R2, capacitors C1-C3. Specifically, the resistor R1 and the capacitor C1 are connected in series, and the voltage at the coupling node of the resistor R1 and the capacitor C1 is referred to as the adjustment node voltage Vadj. The PWM signal is input to the light source driving unit 210 through the resistor R1. The compensation pin COMP of the light source driving unit 210 is also coupled to the capacitors C2, the resistor R2 and the capacitor C3. The capacitance value of capacitor C2 is related to the stability of the system. The capacitor C2 is also referred to as a compensation capacitor. The capacitor C2 has different capacitance values depending on the module characteristics of the R/G/B light source module 120. The capacitance value of the capacitor C2 can range from as large as 10 µF to as small as 22 nF.

In the prior art, the capacitance value of the capacitor C2 affects the timing of the output driving current of the light source module. As a result, in the prior art, the timing of the output driving currents of the R/G/B light source modules is different, leading to poor color mixing, especially during system startup, which diminishes the viewing experience.

The voltage conversion circuit 220 is coupled to the light source driving unit 210 and the light source module 120. The voltage conversion circuit 220 converts the input voltage VIN to an output voltage for the light source module 120. The specific architecture and operation of the voltage conversion circuit 220 are not particularly limited herein. In one possible embodiment of the present invention, the voltage conversion circuit 220 can be a buck converter, but the present invention is not limited thereto. In other possible embodiments of the present invention, the voltage conversion circuit 220 can be of other types, all falling within the scope of the present invention. Furthermore, the voltage conversion circuit 220 can also provide feedback of the driving voltage of the light source module 120 to the light source driving unit 210 and thus the light source driving unit 210 performs constant current control on the driving current output to the light source module 120.

In this embodiment, the delay circuit 240 is coupled to the light source driving unit 210. The delay circuit 240 controls the selection signal S based on the adjustment node voltage Vadj, i.e., the delay circuit 240 determines when to release the selection signal S according to the adjustment node voltage Vadj, thereby the selection signal S controlling the waveform timing of the driving current output from the light source driving unit 210 to the light source module 120. The plurality of delay circuits 240 in the plurality of light source driving circuits 110 release the selection signal S synchronously, ensuring that the plurality of light source driving circuits 110 synchronously output the plurality of driving currents to the plurality of light source modules 110.

In a preferred embodiment, the hysteresis comparator circuit 230 is coupled to the light source driving unit 210. The hysteresis comparator circuit 230 controls the enable signal EN based on the adjustment node voltage Vadj, i.e., the hysteresis comparator circuit 230 determines whether to release (not control) the enable signal EN based on the adjustment node voltage Vadj. The release time of the enable signal EN is earlier than the release time of the selection signal S. In other embodiments, the light source driving circuit 110 may not include the hysteresis comparator circuit 230, and thus the light source driving circuit 110 does not control and release the enable signal EN supplied from the outside.

In the above preferred embodiment of the present invention, the details of how the hysteresis comparator circuit 230 controls the enable signal EN and how the delay circuit 240 controls the selection signal S will now be explained.

As shown in FIG. 2, the hysteresis comparator circuit 230 includes a first hysteresis comparator unit 231, a second hysteresis comparator unit 232, a first switch transistor Q1, resistors R3 to R5, and a diode D.

The two input terminals of the first hysteresis comparator unit 231 receive the adjustable node voltage Vadj and the first reference voltage VREF1, respectively, and the output signal of the first hysteresis comparator unit 231 is input to the second hysteresis comparator unit 232. For example, but not limited to, the positive input terminal and the negative input terminal of the internal operational amplifier (not shown) of the first hysteresis comparator unit 231 receive the adjustable node voltage Vadj and the first reference voltage VREF1, respectively. The first reference voltage VREF1, for example, but not limited to, is 3.3V.

The two input terminals of the second hysteresis comparator unit 232 receive the output signal of the first hysteresis comparator unit 231 and the second reference voltage VREF2, respectively, and the output signal of the second hysteresis comparator unit 232 is input to the control terminal of the first switching transistor Q1. For example, but not limited to, the positive input terminal and the negative input terminal of the internal operational amplifier (not shown) of the second hysteresis comparator unit 232 receive the output signal of the first hysteresis comparator unit 231 and the second reference voltage VREF2, respectively. The second reference voltage VREF2, for example, but not limited to, is 3.3V.

The architecture of the first hysteresis comparator unit 231 and the second hysteresis comparator unit 232 is not specifically limited. For example, each of the first hysteresis comparator unit 231 and the second hysteresis comparator unit 232 may include an amplifying comparator and several resistors, capacitors, and other components.

The first switching transistor Q1 has: a first terminal (e.g., the source terminal) coupled to the ground terminal; a second terminal (e.g., the drain terminal) coupled to a diode D; and a control terminal (e.g., the gate terminal) receiving the output signal of the second hysteresis comparator unit 232.

The diode D is coupled between the enable signal EN and the second terminal of the first switching transistor Q1.

The resistor R3 is coupled between the operating voltage and the control terminal of the first switching transistor Q1. The resistor R4 is coupled between the operating voltage and the second terminal of the first switching transistor Q1. The resistor R5 is coupled between the control terminal and the first terminal of the first switching transistor Q1.

The delay circuit 240 includes: a second switching transistor Q2, a third switching transistor Q3, resistors R6 and R7, and a capacitor C4. The resistors R6 and R7, together with the capacitor C4, can also be referred to as an RC circuit.

The second switching transistor Q2 has: a first terminal (e.g., the source terminal) coupled to the ground terminal; a second terminal (e.g., the drain terminal) coupled to the control terminal of the third switching transistor Q3; and a control terminal (e.g., the gate terminal) coupled to the junction point of the resistor R6 and the capacitor C4.

The third switching transistor Q3 has: a first terminal (e.g., the source terminal) coupled to the ground terminal; a second terminal (e.g., the drain terminal) coupled to the selection signal S; and a control terminal (e.g., the gate terminal) coupled to the second terminal of the second switching transistor Q2.

The resistor R6 is coupled between the adjustable node voltage Vadj and the control terminal of the second switching transistor Q2. The resistor R7 is coupled between the adjustable node voltage Vadj and the control terminal of the third switching transistor Q3. The capacitor C4 is connected between the control terminal of the second switching transistor Q2 and the ground terminal.

Figure 3:
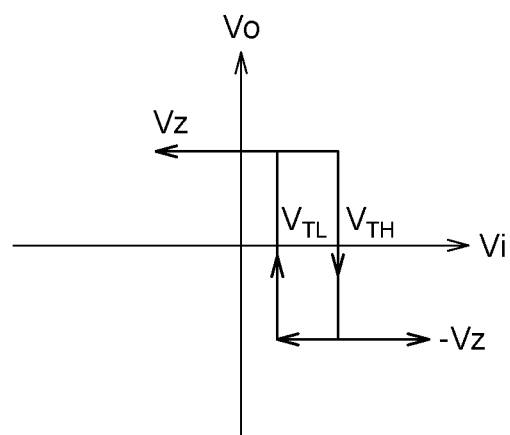
FIG. 3 shows the signal waveform diagram of the hysteresis comparator unit.

FIG. 3 illustrates waveform diagrams of the hysteresis comparator unit in the aforementioned embodiment. As known, when the input voltage Vi of the hysteresis comparator unit rises and reaches the first threshold voltage VTH, the output voltage Vo of the hysteresis comparator unit transitions from a high output voltage Vz to a low output voltage −Vz. When the input voltage Vi of the hysteresis comparator unit decreases and reaches the second threshold voltage VTL, the output voltage Vo of the hysteresis comparator unit transitions from the low output voltage −Vz to the high output voltage Vz. In other embodiments, the range of the output voltage Vo can be designed according to specific requirements. For example, the output voltage Vo may transition between a high output voltage Vz and a low output voltage of 0V, or between a high output voltage of 0V and a low output voltage −Vz. The present invention is not limited to these specific ranges.

Figure 4:
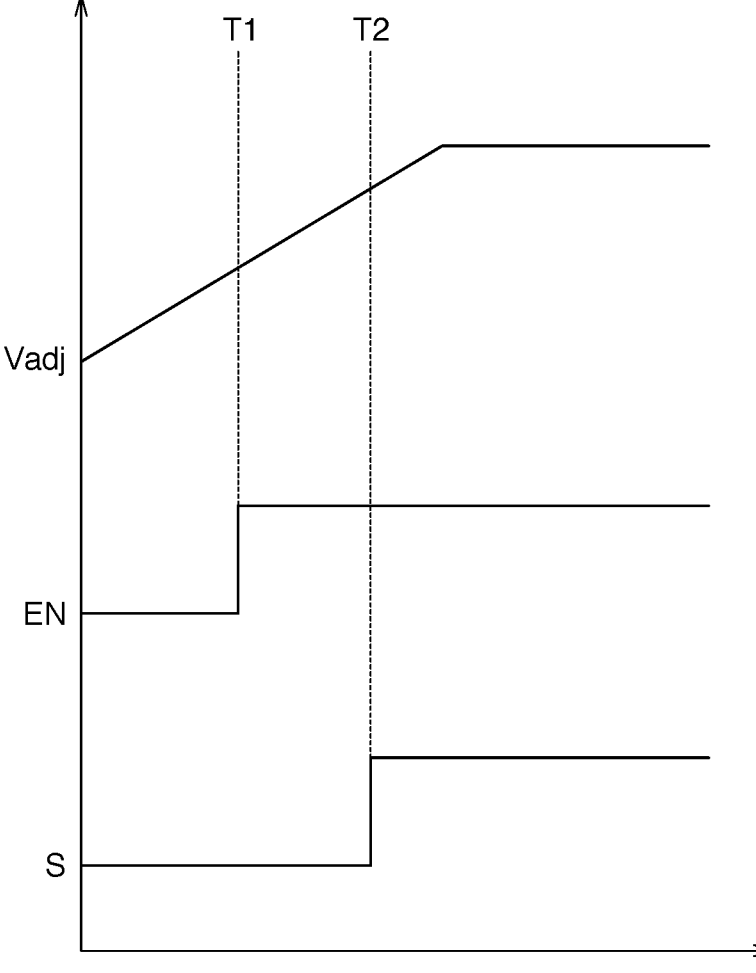
FIG. 4 is a signal waveform diagram of an exemplary embodiment according to the present invention.

FIG. 4 depicts a waveform diagram according to an embodiment of the present invention. Please also refer to FIGS. 2 to 4. Prior to the timing T1, the adjustable node voltage Vadj is still lower than the first reference voltage VREF1. Therefore, the first hysteresis comparator unit 231 outputs a high level (taking high level as positive voltage and low level as 0 voltage in this embodiment) to the second hysteresis comparator unit 232. As long as the first hysteresis comparator unit 231 is still outputting a positive voltage, through the design of resistors, capacitors, and other components, the second hysteresis comparator unit 232 also outputs a positive voltage. When the second hysteresis comparator unit 232 outputs the positive voltage, the first switching transistor Q1 turns on, causing the diode D to conduct and pulling the enable signal EN low, preventing activation of the light source driving unit 210.

In one embodiment of the present invention, the adjustable node voltage Vadj is gradually increased by being charged by the pulse width modulation (PWM) signal.

At timing T1, when the adjustable node voltage Vadj equals or exceeds the first reference voltage VREF1, the first hysteresis comparator unit 231 outputs a 0 voltage to the positive input terminal of the internal operational amplifier (not shown) of the second hysteresis comparator unit 232. Since the negative input terminal of the internal operational amplifier (not shown) of the second hysteresis comparator unit 232 receives the second reference voltage VREF2 (e.g., but not limited to, 3.3V), the second hysteresis comparator unit 232 outputs a 0 voltage to the control terminal of the first switching transistor Q1 to turn off the first switching transistor Q1. When the first switching transistor Q1 is off, the diode D is also turned off. Therefore, the hysteresis comparator circuit 230 cannot continue to pull the enable signal EN low, i.e. releasing the enable signal EN. As a result, in response to the enabled state of the enable signal EN at timing T1, the light source driving unit 210 starts to activate.

After timing T1, the adjustable node voltage Vadj gradually increases because the adjustable node voltage Vadj continues to be charged by the pulse width modulation (PWM) signal. Similarly, the voltage across the capacitor C4 also gradually increases. In one embodiment of the present invention, by designing the values of the resistor R6 and the capacitor C4, the voltage across the capacitor C4 between timing T1 and timing T2 is insufficient to turn on the second switching transistor Q2. However, in response to the adjustable node voltage Vadj at this time, the third switching transistor Q3 is turned on. When the third switching transistor Q3 is conducting, the selection signal S is pulled low, meaning that the light source driving unit 210 still does not output driving current to the light source module 120.

Afterwards, by designing the values of the resistor R6 and the capacitor C4, at timing T2, the voltage across the capacitor C4 is sufficient to turn on the second switching transistor Q2 (the voltage across the capacitor C4 exceeds the threshold voltage of the second switching transistor Q2). The turned on second switching transistor Q2 pulls the control terminal of the third switching transistor Q3 low, causing the third switching transistor Q3 to turn off. The off third switching transistor Q3 is unable to continue pulling the selection signal S low, effectively releasing the selection signal S. Therefore, the selection signal S, which is in an enabled state, can control the light source driving unit 210 to output driving current to the light source module 120.

In one embodiment of the invention, the charging time of the resistor R6 and the capacitor C4 is designed such that the required time for all second switching transistors Q2 to turn on (i.e., timing T2) is longer than the time it takes for voltage across the maximum compensation capacitor C2 to reach a stable level. Here, the maximum compensation capacitor C2 refers to the capacitor with the maximum capacitance value among all the capacitors C2 in the plurality of light source driving modules 110. By doing so, when the voltage across the capacitor C4 reaches the threshold voltage of the second switching transistor Q2, all the light source driving modules 110 can receive the released selection signal S synchronously. In other words, based on the maximum compensation capacitor of the plurality of light source driving circuits 110, the plurality of delay circuits 240 in the plurality of light source driving circuits 110 determine when to synchronously release the selection signal S, allowing all the light source driving modules 110 to output the driving currents synchronously to individual light source modules 120, enabling all the light source modules 120 to emit light synchronously. Therefore, in one embodiment of the invention, when the projection device 100 is powered on, all the light source modules 120 can emit light synchronously, resulting in a startup image with good color mixing and enhancing the entertainment experience for viewers.

In other embodiments, the enabled state of the enable signal EN can also be logic low. In this case, the corresponding hysteresis comparator circuit 230 outputs a high output level for controlling the enable signal EN and outputs a low output level for releasing the enable signal EN. The specific circuit configuration for this case is not described here.

In other embodiments, the enabled state of the selection signal S can also be logic low. In this case, the delay circuit 240 outputs a high output level for controlling the selection signal S and outputs a low output level for releasing the selection signal S. The specific circuit configuration for this case is not described here.

In conclusion, one embodiment of the present invention provides an optical source driving circuit and a projection device using the same. By incorporating a delay circuit and a hysteresis comparator circuit, the optical source driving units are pre-enabled and the selection signals of the optical source driving circuits can be synchronously issued by being behind the enable signals. As a result, synchronized driving currents are provided to the optical source modules, simultaneously illuminating the optical source modules and eliminating the issue of color mixing during the initial projection of images in the projection device. This improves the entertainment experience for viewers.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in a plurality of embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:
1. A projection device comprising:
a plurality of optical source modules; and a plurality of optical source driving circuits, respectively coupled to and driving the plurality of optical source modules, wherein each of the optical source driving circuits includes:

an optical source driving unit, coupled to and driving the optical source module, the optical source driving unit receiving an input voltage, the optical source driving unit receiving and controlled by an enable signal, the enable signal determining whether the optical source driving unit is activated, the optical source driving unit further receiving and controlled by a selection signal, the selection signal determining a timing at which the optical source driving unit outputs a drive current to the optical source module, the optical source driving unit receiving and controlled by a pulse width modulation signal, the pulse width modulation signal controlling a current amplitude of the drive current from the optical source driving unit to the optical source module;

a voltage conversion circuit, coupled to the optical source driving unit and the optical source module, the voltage conversion circuit converting the input voltage and outputting to the optical source module, the voltage conversion circuit providing feedback of a drive voltage of the optical source module to the optical source driving unit, and the optical source driving unit performing constant current control on the drive current output of the optical source module;

a hysteresis comparator circuit, coupled to the optical source driving unit, the hysteresis comparator circuit controlling the enable signal based on an adjusted threshold voltage to determine whether to release the enable signal; and a delay circuit, coupled to the optical source driving unit, the delay circuit controlling the selection signal based on the adjusted threshold voltage to determine when to release the selection signal, the plurality of delay circuits in the plurality of optical source driving circuits release the selection signals synchronously, enabling the plurality of optical source driving circuits to synchronously output the plurality of drive currents to the plurality of optical source modules.

2. The projection device according to claim 1, wherein the plurality of delay circuits in the plurality of optical source driving circuits determine when to synchronously release the selection signals based on a maximum compensating capacitance of the plurality of optical source driving circuits.

3. The projection device according to claim 1, wherein each of the optical source modules comprises a plurality of laser diodes.

4. The projection device according to claim 1, wherein:

the hysteresis comparator circuit comprises a first hysteresis comparator unit, a second hysteresis comparator unit, a first switching transistor, and a diode;

the first hysteresis comparator unit receives the adjustment node voltage and a first reference voltage, and inputs an output signal of the first hysteresis comparator unit to the second hysteresis comparator unit;

the second hysteresis comparator unit receives the output signal from the first hysteresis comparator unit and a second reference voltage, and inputs an output signal of the second hysteresis comparator unit to the first switching transistor to control turning on or turning off of the first switching transistor;

the first switching transistor has a first terminal connected to ground, a second terminal coupled to the diode, and a control terminal receiving the output signal from the second hysteresis comparator unit; and the diode is coupled between the enable signal and the second terminal of the first switching transistor.

5. The projection device according to claim 4, wherein:

when the adjustment node voltage is lower than the first reference voltage, the first hysteresis comparator unit outputs a high level signal to the second hysteresis comparator unit, the second hysteresis comparator unit outputs a high level signal to turn on the first switching transistor and the diode, and the enable signal is pulled down to de-activate the light source driving unit.

6. The projection device according to claim 5, wherein:

the adjustment node voltage is gradually increased when the adjustment node voltage is charged by the pulse width modulation signal;

when the adjustment node voltage reaches or exceeds the first reference voltage, the first hysteresis comparator unit outputs a low level signal to the second hysteresis comparator unit;

the second hysteresis comparator unit to output a low level signal to the first switching transistor to turn off the first switching transistor;

when the first switching transistor is off, the diode is turned off, and the hysteresis comparator circuit releases the enable signal; and in response to the released enable signal, the light source driving unit starts operating.

7. The projection device according to claim 6, wherein:

the delay circuit comprises a second switching transistor, a third switching transistor, and a resistor-capacitor circuit;

the second switching transistor is coupled to the adjustment node voltage through the resistor-capacitor circuit;

the third switching transistor is coupled to the selection signal; and the resistor-capacitor circuit is coupled to the adjustment node voltage.

8. The projection device according to claim 7, wherein:

when a capacitor cross voltage of the resistor-capacitor circuit is insufficient to turn on the second switch transistor, the adjustment node voltage turns on the third switch transistor to pull down the selection signal.

9. The projection device according to claim 8, wherein:

when the capacitor cross voltage of the resistor-capacitor circuit is sufficient to turn on the second switching transistor, the third switching transistor is turned off to release the selection signal.

10. The projection device according to claim 9, wherein a time required for the second switching transistor to turn on is greater than a stabilization time of a voltage across a maximum compensation capacitor.

11. An optical source driving circuit coupled to and driving a optical source module, the optical source driving circuit including:

an optical source driving unit, coupled to and driving the optical source module, the optical source driving unit receiving an input voltage, the optical source driving unit receiving and controlled by an enable signal, the enable signal determining whether the optical source driving unit is activated, the optical source driving unit further receiving and controlled by a selection signal, the selection signal determining a timing at which the optical source driving unit outputs a drive current to the optical source module, the optical source driving unit receiving and controlled by a pulse width modulation signal, the pulse width modulation signal controlling a current amplitude of the drive current from the optical source driving unit to the optical source module;

a voltage conversion circuit, coupled to the optical source driving unit and the optical source module, the voltage conversion circuit converting the input voltage and outputting to the optical source module, the voltage conversion circuit providing feedback of a drive voltage of the optical source module to the optical source driving unit, and the optical source driving unit performing constant current control on the drive current output of the optical source module;

a hysteresis comparator circuit, coupled to the optical source driving unit, the hysteresis comparator circuit controlling the enable signal based on an adjusted threshold voltage to determine whether to release the enable signal; and a delay circuit, coupled to the optical source driving unit, the delay circuit controlling the selection signal based on the adjusted threshold voltage to determine when to release the selection signal.

12. The optical source driving circuit according to claim 11, wherein the delay circuit determines when to release the selection signals based on a compensating capacitance of the optical source driving circuit.

13. The optical source driving circuit according to claim 11, wherein the optical source module comprises a plurality of laser diodes.

14. The optical source driving circuit according to claim 11, wherein:

the hysteresis comparator circuit comprises a first hysteresis comparator unit, a second hysteresis comparator unit, a first switching transistor, and a diode;

the first hysteresis comparator unit receives the adjustment node voltage and a first reference voltage, and inputs an output signal of the first hysteresis comparator unit to the second hysteresis comparator unit;

the second hysteresis comparator unit receives the output signal from the first hysteresis comparator unit and a second reference voltage, and inputs an output signal of the second hysteresis comparator unit to the first switching transistor to control turning on or turning off of the first switching transistor;

the first switching transistor has a first terminal connected to ground, a second terminal coupled to the diode, and a control terminal receiving the output signal from the second hysteresis comparator unit; and the diode is coupled between the enable signal and the second terminal of the first switching transistor.

15. The optical source driving circuit according to claim 14, wherein:

when the adjustment node voltage is lower than the first reference voltage, the first hysteresis comparator unit outputs a high level signal to the second hysteresis comparator unit, the second hysteresis comparator unit outputs a high level signal to turn on the first switching transistor and the diode, and the enable signal is pulled down to de-activate the light source driving unit.

16. The optical source driving circuit according to claim 15, wherein:

the adjustment node voltage is gradually increased when the adjustment node voltage is charged by the pulse width modulation signal;

when the adjustment node voltage reaches or exceeds the first reference voltage, the first hysteresis comparator unit outputs a low level signal to the second hysteresis comparator unit;

the second hysteresis comparator unit to output a low level signal to the first switching transistor to turn off the first switching transistor;

when the first switching transistor is off, the diode is turned off, and the hysteresis comparator circuit releases the enable signal; and in response to the released enable signal, the light source driving unit starts operating.

17. The optical source driving circuit according to claim 16, wherein:

the delay circuit comprises a second switching transistor, a third switching transistor, and a resistor-capacitor circuit;

the second switching transistor is coupled to the adjustment node voltage through the resistor-capacitor circuit;

the third switching transistor is coupled to the selection signal; and the resistor-capacitor circuit is coupled to the adjustment node voltage.

18. The optical source driving circuit according to claim 17, wherein:

when a capacitor cross voltage of the resistor-capacitor circuit is insufficient to turn on the second switch transistor, the adjustment node voltage turns on the third switch transistor to pull down the selection signal.

19. The optical source driving circuit according to claim 18, wherein:

when the capacitor cross voltage of the resistor-capacitor circuit is sufficient to turn on the second switching transistor, the third switching transistor is turned off to release the selection signal.

20. The optical source driving circuit according to claim 19, wherein a time required for the second switching transistor to turn on is greater than a stabilization time of a voltage across a compensation capacitor.

* * * * *